United States Patent

[11] 3,534,733

| [72] | Inventors | Clifford G. Phipps<br>Newbury Park;<br>Sam H. Ridgway; Herbert O. Knecht and<br>Frank R. Braun, Camarillo, California |
|---|---|---|
| [21] | Appl. No. | 696,741 |
| [22] | Filed | Jan. 10, 1968 |
| [45] | Patented | Oct. 20, 1970 |
| [73] | Assignees | The United States of America as represented by the Secretary of the Navy; |

[54] SPRING-LOADED SUCTION CUP-TYPE BIOMEDICAL INSTRUMENTATION ELECTRODE
2 Claims, 2 Drawing Figs.

[52] U.S. Cl. ................................................ 128/2.1,
128/418
[51] Int. Cl. ..................................................... A61q 5/05
[50] Field of Search ............................................ 128/(Pickup Electrode Digest), 404, 417, 418, 2.06, 2.1, 416

[56] References Cited
UNITED STATES PATENTS

| 2,318,207 | 5/1943 | Ellis | 128/404 |
|---|---|---|---|
| 2,660,175 | 11/1953 | Thrasher et al. | 128/404 |
| 3,380,445 | 4/1968 | Frasier | 128/2.06 |
| FOREIGN PATENTS | | | |
| 1,355,600 | 2/1964 | France | 128/2.06 |

*Primary Examiner*—William E. Kamm
*Attorneys*—Q. Baxter Warner and George J. Rubens ABSTRACT: An electrode for picking up bioelectric potentials from the body surface of a subject wherein a conductive material electrode is slidingly received in a holder and biased against the skin surface by a spring within the holder. The holder is mounted in a flexible rubber cup which seals at its periphery against the skin and retains the electrode in place by suction pressure despite movement of the subject under examination. This device has bilateral characteristics in that it may conduct bioelectric energies from somatic element to an external receiving equipment or may conduct energies from an external equipment to the somatic element.

Patented Oct. 20, 1970

3,534,733

INVENTORS
CLIFFORD G. PHIPPS
SAM H. RIDGWAY
HERBERT O. KNECHT
FRANK R. BRAUN

BY Q. Baxter Warner
ATTORNEY

0
SPRING-LOADED SUCTION CUP-TYPE BIOMEDICAL INSTRUMENTATION ELECTRODE

The invention described herein may be manufactured and used by or for the Government of the United States of America for governmental purposes without the payment of any royalties thereon or therefor.

BACKGROUND OF THE INVENTION

1. Field of the Invention

This invention relates to medical instrumentation electrodes which are adapted for use on the skin surface of a subject in a dynamic environment. The invention is disclosed as embodied in an electrode for underwater cetaceans such as porpoises though it will be apparent that it is readily adapted for other and similar applications.

The problem of providing a compatible electrical interface between mammalian tissue and the input to or output from an electronic medical instrumentation is well recognized in the art and various methods have been proposed to satisfactorily attach such electrodes without discomfort and psychophysiologic distortion of the phenomena being measured. Some of the problems involve interface potential differences, polarization, electrode pressure control, maintenance of the necessary concentration of conductive gel, adequate frictional coefficient to prevent shear movement of the conductor, maintenance of fixed physical geometry despite substantial movements of the subject, and avoidance of distortion of the tissue geometry with consequent variations in bioelectric potentials.

2. Description of the Prior Art

Heretofore electrodes for making low-level current measurements such as electroencephalograms, electrocardiograms, etc. have employed relatively large metal plates of stainless steel or copper supported in place by clamps, elastic straps, adhesive tape, etc. and frequently requiring that a portion of the mammal be encircled in order to hold the device in place. There are several disadvantages of such prior constructions, an important one being the low shear friction between plate and body surface which permits the electrode to shift and move about in a dynamic environment to thereby introduce movement artifacts into the instrumentation input. This is aggravated by variable seating forces on the electrode and consequent variations in the conducting bridge from plate to body surface.

Such prior constructions usually employ ionic gel to enhance conductivity but, in an underwater environment, this is usually washed away and such gel loss results in higher electrode interface resistance. When somatic bioelectric source impedance increases the signal to noise ratio of the system decreases. Such change will render the bioelectric data useless.

Furthermore, the use of a stainless steel plate material introduces an electro chemical gradient of approximately 10–50 mv per interface couple and this interface potential difference variation with time, polarization, pressure, gel concentration, etc. may cause the ECG trace baseline to wander and degrade the usefulness of the data.

SUMMARY OF THE INVENTION

The present electrode is particularly adapted to a dynamic environment or one wherein large movements and changes in surrounding liquid or air-pressure medium are involved. It employs an electrode of Ag/AgCl with or without an ionic gel which is applied against the body surface with a constant pressure and is surrounded by a leak-proof enclosure which, when deformed into body surface engagement, urges a pair of concentric ring-like sealing areas into firm contact with the body surface.

Other objects, advantages, and novel features of the invention will become apparent from the following detailed description of the invention when considered in conjunction with the accompanying drawings.

DESCRIPTION OF THE PREFERRED EMBODIMENT

The invention illustrated has been found to be particularly adaptable for use in a marine environment where it is desired to apply an electrode to the body surface of a dynamic movable object such as a cetacean and to conduct electrical impulses to or from such an electrode to a measuring or testing instrument.

The embodiment illustrated employs a suction cup 10 which is preferably made of pliable silicone rubber of the type commercially available from General Electric Co. and known as RTV-615 and may readily be deformed by manual or hydrostatic pressure to cause the inner face 12 thereof to approach and cling to the body surface in the manner common to suction apparatus of such character.

The electrode tip 14 employed in this embodiment may be of the general character disclosed in U. S. Pat. No. 3,137,291 to Clifford G. Phipps and George G. Lucchina being composed of silver/silver chloride and being particularly adapted for the acquisition and conduction of currents to or from the surface of a body being investigated.

Figure 1:
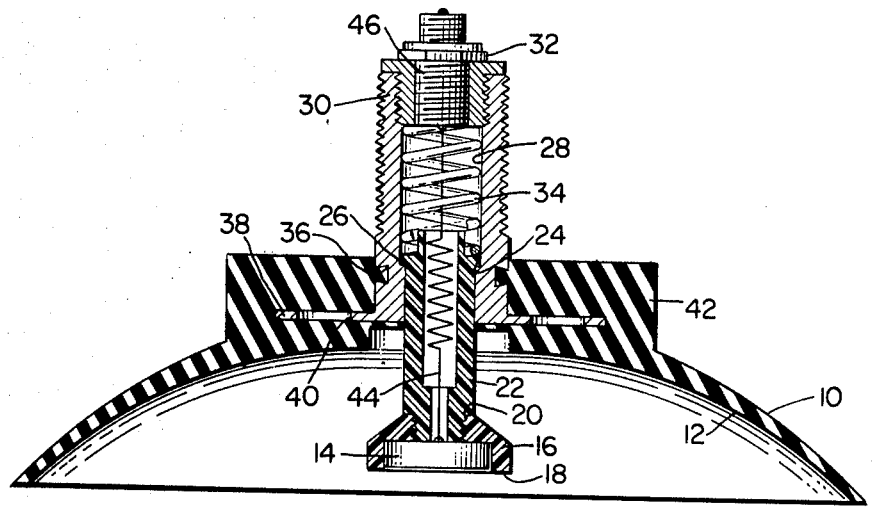
FIG. 1 is a vertical sectional view taken along the center line axis of an electrode assembly incorporating the present invention.
Figure 2:
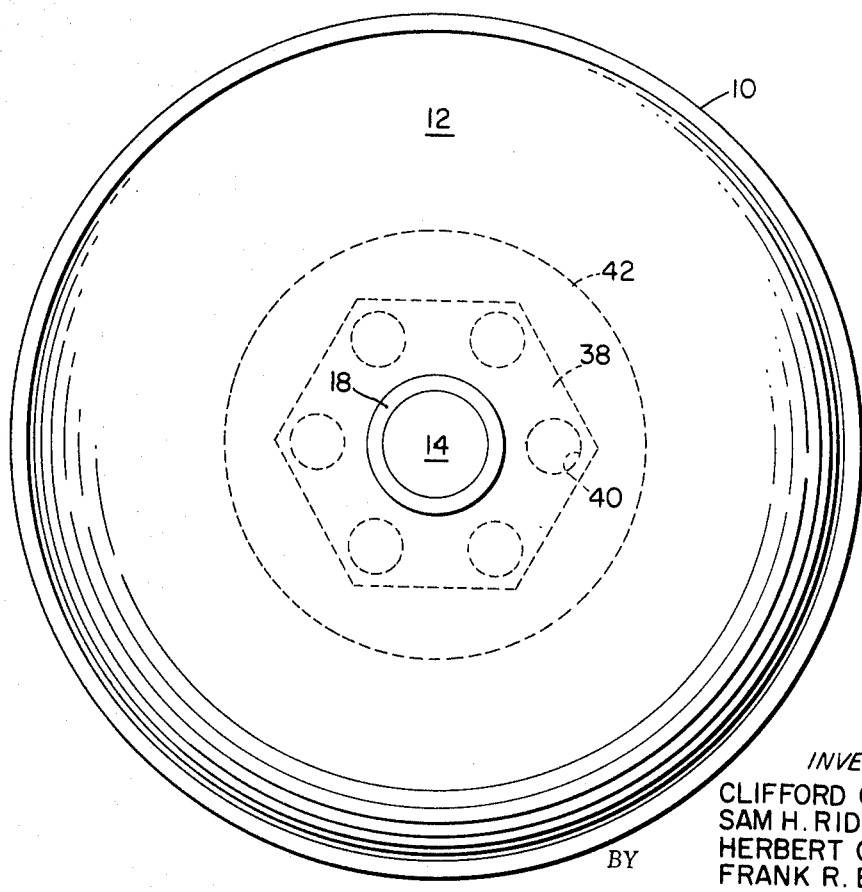
FIG. 2 is a bottom view of the device of FIG. 1.

As shown in FIG. 1 this electrode tip may be housed in a cap 16 having a peripheral margin 18 which upon assembly with the electrode preferably protrudes a short distance so as to firmly engage the body tissue all about the electrode 14. This cap 16 has a reduced center bore portion 20 which may be threaded so that the cap and electrode are supported at the end of a stem 22 formed of a suitable plastic material such as Delron. The upper end of the stem may be provided with a peripheral ledge 24 which engages with a shoulder 26 to limit downward movement of the stem 22 as illustrated. The shoulder 26 in turn is located in the bore 28 of a tubular spring enclosing housing 30 which is internally threaded to receive a flanged fitting 32 which holds a compression spring 34 in place.

The housing 30 may be provided with a dovetail-shaped external groove 36 and a disc-like flange 38 having a plurality of circumferential perforations 40 therein. The groove 36 and flange 38 are embedded in the boss 42 of suction cup 10 and effectively lock the parts together.

From the electrode 14 a flexible lead wire 44 extends through the axial opening of the stem 22 and is received in an electric fitting 46 which may be part of a conventional coaxial connector system from which electrically shielded connections extend to the test instrument. As shown the lead wire 44 may be spring-like in form to prevent entanglement during movement.

If desired, electrode tablet 14 may be somewhat thinner in construction and a small Graphojel-filled sponge disc inserted adjacent the body surface. In any event the electrode and the body surface are coated with a conductive gel such as the commercially available "Graphojel" manufactured by the Tablax Co., New York, N.Y. The manner of use of such a conductive gel is described in U. S. Pat. No. 3,170,459 issued to Clifford G. Phipps and Glenn F. Kelly.

As previously mentioned a low galvanic interface potential is desired and also a modicum of lateral or shear movement of the electrode with respect to the adjacent tissue is necessary in order to minimize movement artifact electrical variations.

In order to assure microscopic mating of the dissimilar body surface and suction cup materials, the latter is made extremely pliable and feathers toward the peripheral edges to a fairly thin dimension. The hide of a cetacean is characteristically uneven in surface configuration and is firm in structure so that most of the pliability must be achieved by the plastic cup material.

With the device applied in place and the cup depressed so that much of the peripherally feathered portion lies closely adjacent the body surface spring 34 is compressed and thereafter exerts a constant force upon the electrode to urge it against the body surface. The conducting gel furnishes an effective electrical bridge under fixed pressure conditions between the tissue surface and the electrode assuring fidelity in transmission of a.c. current variations and minimizing d.c. fluctuations which might otherwise occur. With the constant pressure applied as aforesaid, there is a close seal between the Delron cap peripheral edge 18 and the body surface.

It will be apparent that in addition to assuring positive contact between the electrode and the body surface, the electrode and its cup together with the conductive gel are effectively protected by the large feather edged suction cup to eliminate any prospect of dilution by the surrounding water. Also with this arrangement no restraining strap or member-encircling girdle need be used with the resultant interference with subject motility.

Obviously many modifications and variations of the present invention are possible in the light of the above teachings. It is therefore to be understood that within the scope of the appended claims the invention may be practiced otherwise than as specifically described.

We claim:

1. An underwater interface device for establishing a low impedance shielded electrical connection between the surface of mammalian tissue and remote electronic instrumentation in order to permit measurement of phenomena in a dynamic environment with minimal introduction of psycho-physiologic and radiation initiated distortion into such measurement comprising:

an electrically conductive tissue surface contacting electrode;

an elongate stem of non-conductive material having an enlarged cap at one end to receive said electrode;

said stem having an axial bore therethrough;

a tubular housing of conductive material surrounding said stem and having an axial opening to receive said stem for sliding movement therein;

a closure for the upper end of said opening, said closure having a coaxial electrical conduit extending therethrough with a central portion and a shielding outer portion;

a compression spring interposed between the bottom surface of said closure and the upper end of said stem so as to normally urge said stem downwardly;

a deformable suction cup having a thick central portion to support said housing and a tapered, flexible, thin peripheral portion to sealingly engage the surface of said tissue;

said housing having a radially directed metal flange imbedded in the thickened central portion of said suction cup to reinforce the rigidity thereof and retain said housing in perpendicular alignment therewith;

a coil spring shaped electrical lead joining the center contact of the coaxial fitting in said closure with the tissue surface contacting electrode; and so that the inner conductor of a coaxial cable is electrically connected to said electrode while the outer sheath of said coaxial cable is connected to the conductive housing and associated conductive parts.

2. The device of claim 1 wherein the stem has a recessed cup at the end thereof and the conductive electrode is recessed into said cup.